United States Patent [19]

Ninomiya et al.

[11] Patent Number: 5,113,246
[45] Date of Patent: May 12, 1992

[54] IMAGE SENSING APPARATUS FOR CORRECTING A DEFECT IN COLOR SIGNALS GENERATED BY A CCD

[75] Inventors: Kunio Ninomiya, Kawasaki; Akira Suga, Yokohama, both of Japan

[73] Assignee: Canon Kabushiki Kaisha, Tokyo, Japan

[21] Appl. No.: 587,554

[22] Filed: Sep. 24, 1990

Related U.S. Application Data

[63] Continuation of Ser. No. 300,727, Jan. 25, 1989, abandoned, which is a continuation of Ser. No. 917,479, Oct. 10, 1986, abandoned.

[30] Foreign Application Priority Data

Oct. 11, 1985 [JP] Japan .................. 60-224770
Feb. 13, 1986 [JP] Japan .................. 61-027859

[51] Int. Cl.$^5$ ........................................ H04N 9/093
[52] U.S. Cl. ............................... 358/44; 358/163
[58] Field of Search ............... 358/41, 43, 44, 163, 358/213.17, 213.15

[56] References Cited

U.S. PATENT DOCUMENTS

| | | | |
|---|---|---|---|
| 4,237,488 | 12/1980 | Takemura | 358/163 |
| 4,377,820 | 3/1983 | Reitmeier | 358/21 R |
| 4,434,435 | 2/1984 | Fujimoto | 358/44 |
| 4,496,967 | 1/1985 | Sase et al. | 358/44 |
| 4,524,390 | 6/1985 | Lemke | 358/213.17 |
| 4,535,359 | 8/1985 | Fearnside | 358/213.17 |
| 4,567,525 | 1/1986 | Endo et al. | 358/213.17 |
| 4,590,520 | 5/1986 | Frame et al. | 358/163 |
| 4,602,291 | 7/1986 | Temes | 358/221 |
| 4,654,698 | 3/1987 | Langworthy | 358/43 |
| 4,698,685 | 10/1987 | Beaverson | 358/213.15 |
| 4,734,774 | 3/1988 | Skaggs et al. | 358/213.15 |
| 4,739,495 | 4/1988 | Levine | 364/571 |
| 5,047,861 | 9/1991 | Houchin et al. | 358/213.15 |

FOREIGN PATENT DOCUMENTS 54-98120 8/1979 Japan .
60-1981 1/1985 Japan .

Primary Examiner—James J. Groody
Assistant Examiner—Kim Yen Vu
Attorney, Agent, or Firm—Fitzpatrick, Cella, Harper & Scinto

[57] ABSTRACT

An image sensing apparatus is equipped with an image sensor device for taking the image of an object through a color separation optical system of a predetermined color pattern, a separating circuit for separating the signal time-sequentially obtained from the image sensor device into predetermined color components, and a correction circuit for correcting a defect of thus separated color signal with an immediately preceding signal of a same color, thus preventing the formation of a false color signal resulting from defect correction of the image signal.

18 Claims, 7 Drawing Sheets

IMAGE SENSING APPARATUS FOR CORRECTING A DEFECT IN COLOR SIGNALS GENERATED BY A CCD

This application is a continuation of application Ser. No. 300,727, filed Jan. 25, 1989, which was a continuation of application Ser. No. 917,479, which was filed Oct. 10, 1986, both are now abandoned.

BACKGROUND OF THE INVENTION

1. Field of the Invention

The present invention relates to a defect correcting apparatus for a solid state image sensor.

2. Related Background Art

There are already known solid state image sensors utilizing semiconductor such as charge-coupled device or CCD.

A CCD is composed of a silicon semiconductor substrate bearing an $SiO_2$ layer on a face thereof, on which electrodes are formed with a regular pitch. An optical image is projected from the side of the electrodes or from the opposite side, thereby accumulating electric charges in the portions of the semiconductor positioned under the electrodes, and the thus accumulated charges are transferred in succession and read out by clock pulses supplied to the electrodes.

Such solid state image sensor utilizing semiconductor tends to generate local defects in the crystal structure due to the difficulty in the preparation of uniform semiconductor crystal over a desired area, and there may result an abnormally high dark current because a charge is easily generated in the position of such defect by a thermal phenomenon. For this reason, in projecting an optical image and reading the resulting signals as explained above, noises are generated corresponding to the positions of such high dark current.

Thus, as shown in FIG. 1, a noise N higher than the white level may become present in the image signal So and become conspicuous in the reproduced image.

An already proposed method for eliminating such noise utilizes a memory. In this method, the memory remembers the crystal defects in the semiconductor substrate and controls the output signal from the solid state image sensor so as to eliminate the noises.

Such a memory stores information on the presence or absence of crystal defects, usually the information given for each pixel.

Consequently, a CCD having $N_H$ and $N_V$ pixels respectively in the horizontal and vertical detections requires a memory capacity of $N_H \cdot N_V$ bits. In order to obtain an image equivalent to the usual television image, the value of $N_H$ is in a range of 300 to 500, and that of $N_V$ is in a range of 200 to 300. The storage of crystal defects in the above-explained method requires a large memory capacity, and the solid state image sensing apparatus cannot be obtained inexpensively since the defect correcting device of this method requires an expensive memory circuit.

FIG. 2 is a block diagram of a conventional image sensing apparatus, provided with a CCD 1, a sample and hold circuit 2, an amplifier 3, a clock pulse generator 4, a flaw memory 5 storing the information on the crystal defects in advance, a gate circuit 6, and accumulated image signal SO.

FIG. 3 is a wave form chart showing the relationship between the sample and hold circuit and the gate circuit for a crystal defect, wherein (a) indicates an output signal to the sample and hold circuit 2, and (b) indicates an output signal of the gate circuit 6.

In such apparatus, the positions of the pixels having crystal defects in the CCD 1 are stored in advance in the memory circuit 5, and the image signals are read, as shown in FIG. 3(a), by clock signals from the clock pulse generator 4. A signal from a normal pixel is periodically reset, in the sample and hold circuit 2, by a signal supplied from the clock pulse generator 4 through the gate circuit 6, but the resetting is not effected in a position of a defective pixel to replace such defective signal with the retained signal of the immediately preceding pixel.

However, in case a striped or mosaic filter of for example red, green and blue is employed in such conventional image sensing apparatus, the luminance signal can be formed in this method without difficultly because the signal of the defective pixel has a strong relation to that of the immediately preceding pixel but the chroma signal cannot be formed by this method because the preceding pixel is of a different color. In this manner the correction of a noise in the chorma signal has resulted in the formation of a false signal.

For reducing the memory capacity there has also been proposed to store the positions of crystal defects in encoded form, instead of storing the presence or absence of defect in each pixel. The position of a crystal defect can be encoded by the X- and Y-coordinates of the defect on the plane of the semiconductor substrate. The position of a pixel in the horizontal scanning direction can be represented by 9 bits in case the number $N_H$ of pixels in the direction is of the order of 500. Also the position of a pixel in the vertical scanning direction can be represented by 8 bits in case the number $N_V$ of pixels in the direction is of the order of 300 in an interlace scanning method, plus 1 bit for identifying whether the defect is present in an odd field or an even field.

Consequently the position of a defect can be represented by 18 bits, including X and Y coordinates and field identification. Thus, if a CCD can tolerate for example 20 defects at maximum, the total memory capacity can be reduced to about 400 bits.

FIG. 4 shows an example of a conventional defect compensating apparatus employing such memory, wherein the CCD is driven by an interline transfer method as shown in FIG. 5.

As shown in FIG. 5, the CCD is provided with a plurality of pixels arranged in vertical direction, and each column of pixels is associated with a vertical shift register 8 for transferring charges. The charges transferred by the vertical shift register 8 are then transferred by a horizontal shift register 9 pixel by pixel and are read through a terminal 10.

There are shown an image taking pulse $P_I$, a transfer pulse $P_V$ supplied to the register 8, and a read-out pulse $P_H$ supplied to the horizontal register 9.

Then referring to FIG. 4, the image of an object 16 is projected through an optical system 17 onto a CCD 15, and an output signal obtained at the terminal 10 is supplied, through a sample and hold circuit 18, to an output terminal 19. The sampling state of the sample and hold circuit 18 is controlled by sampling pulses $P_S$ synchronized with the read-out pulses $P_H$ and controlled by the output of the memory.

There is provided a memory device (defect memory circuit) 25 composed for example of a read-only memory and storing the positions of defects in encoded form. An address counter 35 for the CCD is composed of a horizontal counter 35H for counting the horizontal position and a vertical counter 35V for counting the vertical direction. The horizontal counter 35H receives the read-out pulses $P_H$, and a reset terminal thereof receives a horizontal synchronization signal HD as a reset signal.

Similarly the vertical counter 35V receives the transfer pulses $P_V$, and a vertical synchronization signal VD as a reset signal.

A position signal $S_L$ obtained in the counter 35 is supplied, together with a field signal $S_F$ indicating an odd field or an even field, to an identity circuit 36, which also receives an output $S_M$ of the defect memory circuit 25 and supplies an identity signal $S_Q$ when the output $S_M$ of the defect memory coincides with the position signal $S_L$ and the field signal $S_F$, together with the sampling pulse $P_S$, to a gate circuit 37. In this state the output $S_Q$ is shifted to "1" to interrupt the output $P_{SO}$ of the gate circuit, thereby interrupting the function of the sample and hold circuit 18 and causing the sample and hold circuit to retain the state of an immediately preceding pixel.

Consequently a defect noise present in the image signal in this period is eliminated by the function of the sample and hold circuit 18 and is compensated by the signal of an immediately preceding pixel.

The identity output signal $S_Q$ is also supplied to the address counter 38 to release the position of a succeeding defect. A reset terminal 38a thereof receives a signal supplied at an interval of the frame.

However such defect compensating apparatus, in which the signal of a defective pixel is replaced by the signal of an immediately preceding pixel, may generate false signals in case the image of the object has no correlation in the horizontal direction, thus resulting in a significant deterioration in the image quality.

SUMMARY OF THE INVENTION

In consideration of the foregoing, an object of the present invention is to provide an image sensing apparatus capable of completely eliminating local noises such as those resulting from crystal defects.

The above-mentioned object can be achieved by providing an embodiment of the image sensing apparatus with means for sensing the image of an object through a color separating optical system of a predetermined color pattern, means for separating a time sequential signal, obtained from the image sensing means, into predetermined colors, and correction means for compensating for a defect in the separated color signal with an immediately preceding signal of the same color.

This embodiment is not associated with the false signal in the chroma signal, since the image of the object is sensed through the color separation optical system of a predetermined color pattern to obtain a time sequential signal, which is then separated into respective colors, and the defect in the separated color signal is compensated for by an immediately preceding signal of the same color.

Another object of the present invention is to provide a defect correcting apparatus for a solid state image sensing device, capable of complete defect correction even for an object lacking horizontal correlation.

The above-mentioned object can be achieved by another embodiment of the present invention, which is provided with first memory means for storing the positions of crystal defects of the solid state image sensing device, second memory means for storing noise levels resulting from the crystal defects and corresponding to the defect positions, subtraction control means for detecting the position of a crystal defect from the first memory means at image sensing, then obtaining the noise level from the second memory corresponding to thus detected position of defect, and generating subtraction data, and subtraction means for subtracting the subtraction data from the output of the solid state image sensing device.

This embodiment ensures precise and accurate defect compensation for any object, since a noise component corresponding to a crystal defect is subtracted from the output signal of the solid state image sensing device containing such crystal defect.

The foregoing and still other objects of the present invention, and the effect and advantage thereof, will become fully apparent from the following description which is to be taken in conjunction with the attached drawings.

DETAILED DESCRIPTION OF THE PREFERRED EMBODIMENTS

Figure 1:
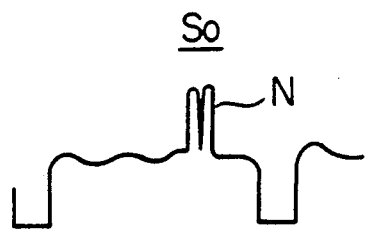
FIG. 1 is a schematic chart showing a dark current noise resulting from a crystal defect.
Figure 2:
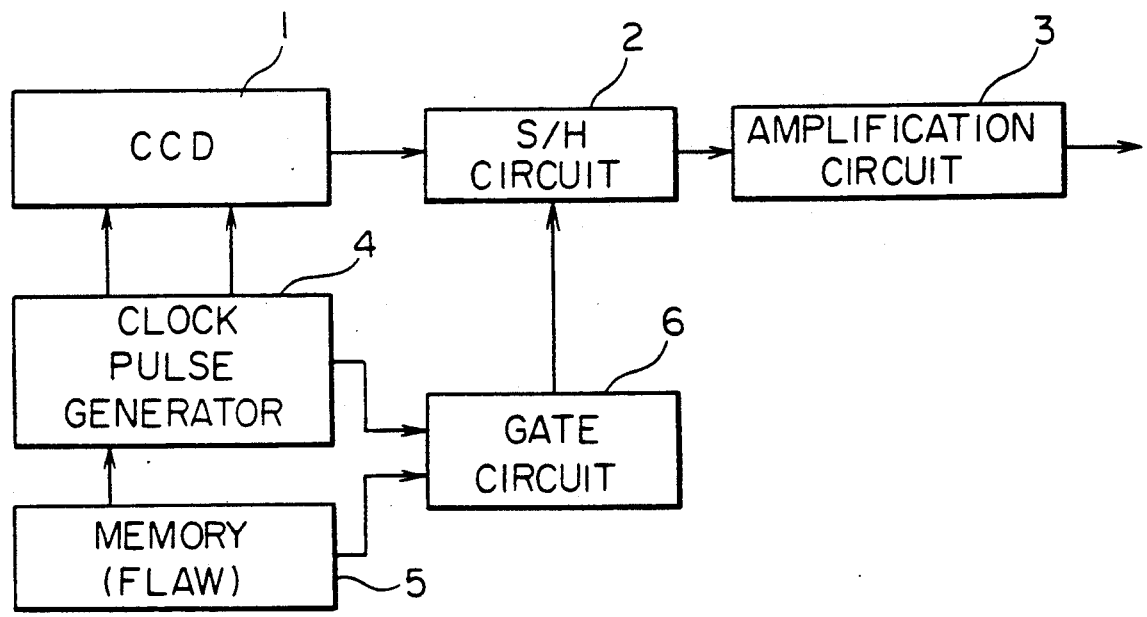
FIG. 2 is a block diagram of a conventional image sensing apparatus.
Figure 3:
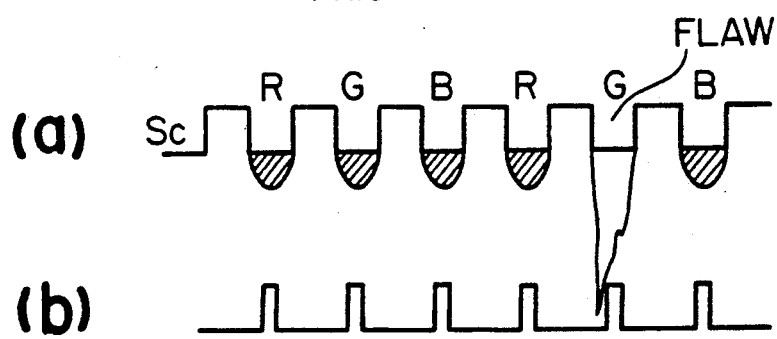
FIG. 3 is a wave form chart showing the relation between a sample and hold circuit and a gate circuit shown in FIG. 2.
Figure 4:
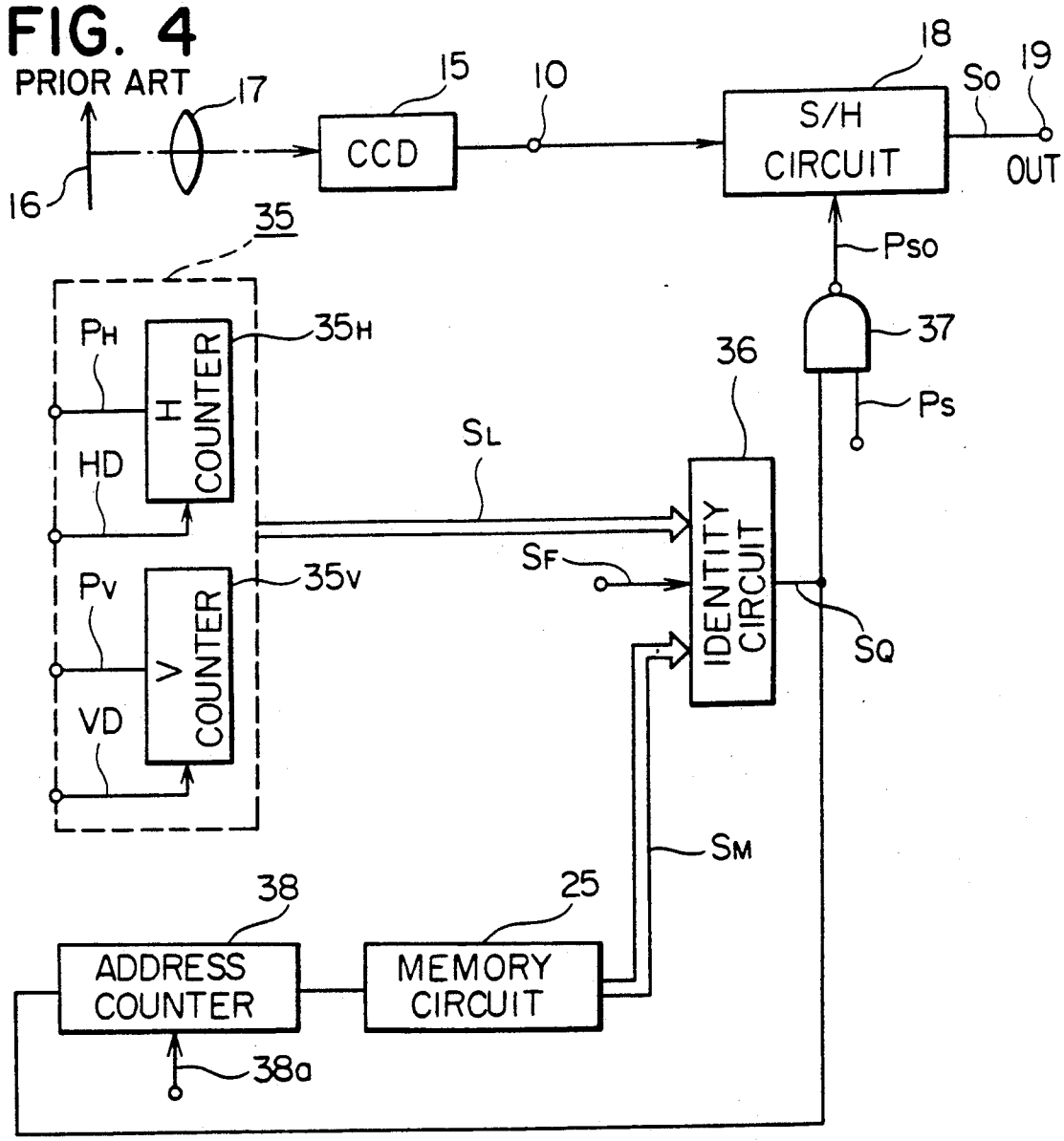
FIG. 4 is a block diagram of a conventional defect compensating apparatus.
Figure 5:
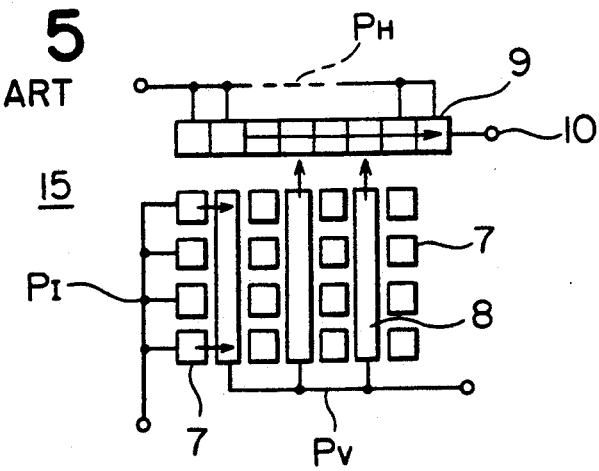
FIG. 5 is a schematic view of a solid state image sensor of the interline transfer type.
Figure 6:
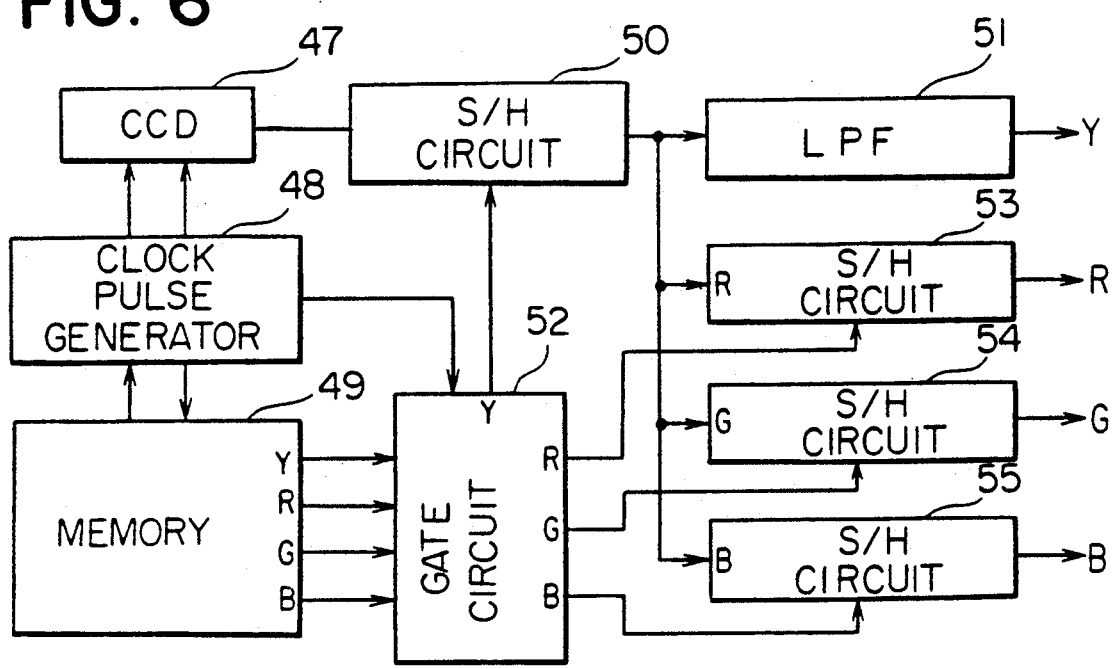
FIG. 6 is a block diagram of a first embodiment of the present invention.
Figure 7:
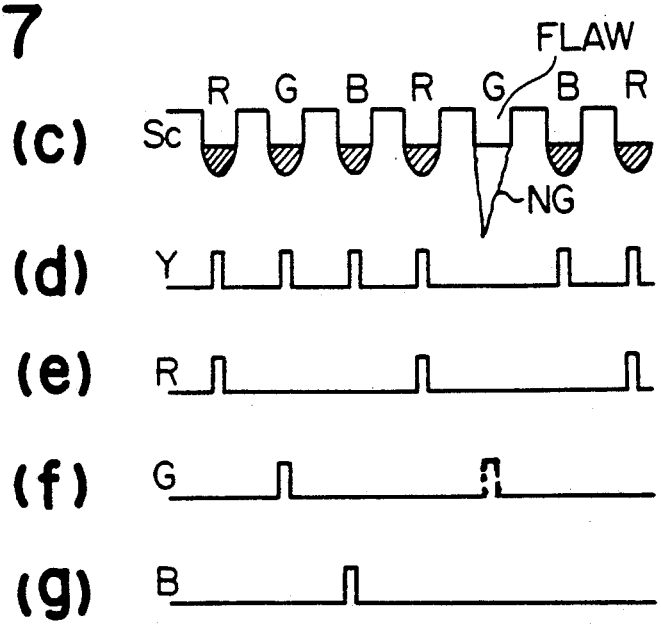
FIG. 7 is a wave form chart showing a sample and hold circuit and gate circuits shown in FIG. 6.

FIG. 6 is a block diagram of an embodiment of the present invention, and FIG. 7 is a wave form chart showing the relationship between a sample and hold circuit and gate circuits. In FIGS. 6 and 7 there are shown a luminance signal Y; chroma signals R, G, B; a CCD 47; a clock pulse generator 48; a memory 49 storing the positions of crystal defects for each color; a sample and hold circuit 50 provided in a luminance signal circuit; a low pass filter 51; a gate circuit 52; and sample hold circuits 53, 54, 55 provided in a chroma signal circuit. Other components are same as those shown in FIG. 2.

Figure 8:
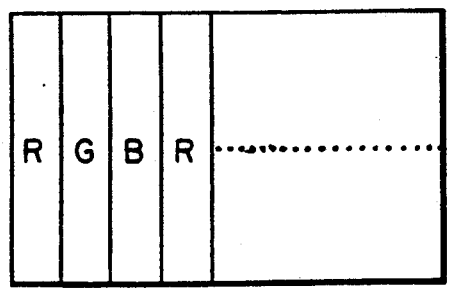
FIG. 8 is a schematic view of a color separation filter.

In the above-explained apparatus, the image of an object is sensed by the CCD 47 through a color separation optical system equipped with a striped filter for example of red, blue and green as shown in FIG. 8. The image thus sensed is read out as an accumulated image signal $S_C$ in synchronization with clock pulses from the clock pulse generator 48, and supplied to the sample and hold circuit 50 in the form shown in FIG. 7. A portion $N_G$ indicates a noise caused for example by a local crystal defect in CCD 47 and has a particularly high level due to an abnormally high dark current. The clock pulses from the clock pulse generator 48 are supplied also to the gate circuit 52. As an example of a memory for storing the signal time-sequentially read from the image sensing device in respective colors, there is provided a memory 49 which is used for storing the positions of crystal defects of the CCD 47 in respective colors such as red, green and blue. Also as an example of means for compensating for the defect in the separated and stored color signal with an immediately preceding signal of a same color, there is provided a following structure. In response to a command pulse from the memory 49, the gate circuit 52 supplies a sampling pulse to the sample and hold circuits 53, 54 and 55. Also the sample and hold circuit 50 for the luminance signal receives a sampling pulse as shown in FIG. 7(d). At the position of the above-mentioned noise $N_G$ in the accumulated image signal $S_C$, the sampling pulse is intercepted by the gate circuit 52 to retain the signal of an immediately preceding bit, thus eliminating the noise signal $N_G$. The signal after extraction of said noise $N_G$ is supplied to the low pass filter 51 for forming the luminance signal, and is also supplied, for forming chroma signals, to the sample and hold circuits 53, 54, 55 respectively for red, green and blue signals, which receive sampling pulses, respectively shown in FIGS. 7(e), 7(f) and 7(g), from the gate circuit 52. In this manner the sample and hold circuit 53 obtains a red signal only in response to a corresponding sampling pulse. Similarly the circuit 55 obtains a blue signal only. In the green signal containing a noise, at the position of the noise, a state immediately preceding the noise is retained as shown in FIG. 7(f). In this manner there are obtained red, green and blue color signals of correct colors in which noises are eliminated.

As explained in the foregoing, the present embodiment is provided with means for sensing the image of an object through a color separation optical system of a predetermined color pattern, means for separating the signal time sequentially obtained from the image sensing means into predetermined colors, and correction means for compensating for a defect in the separated color signal with an immediately preceding signal of the same color, and is therefore capable of generating each color signal without noises resulting for example from local crystal defects of the image sensing means.

Figure 9:
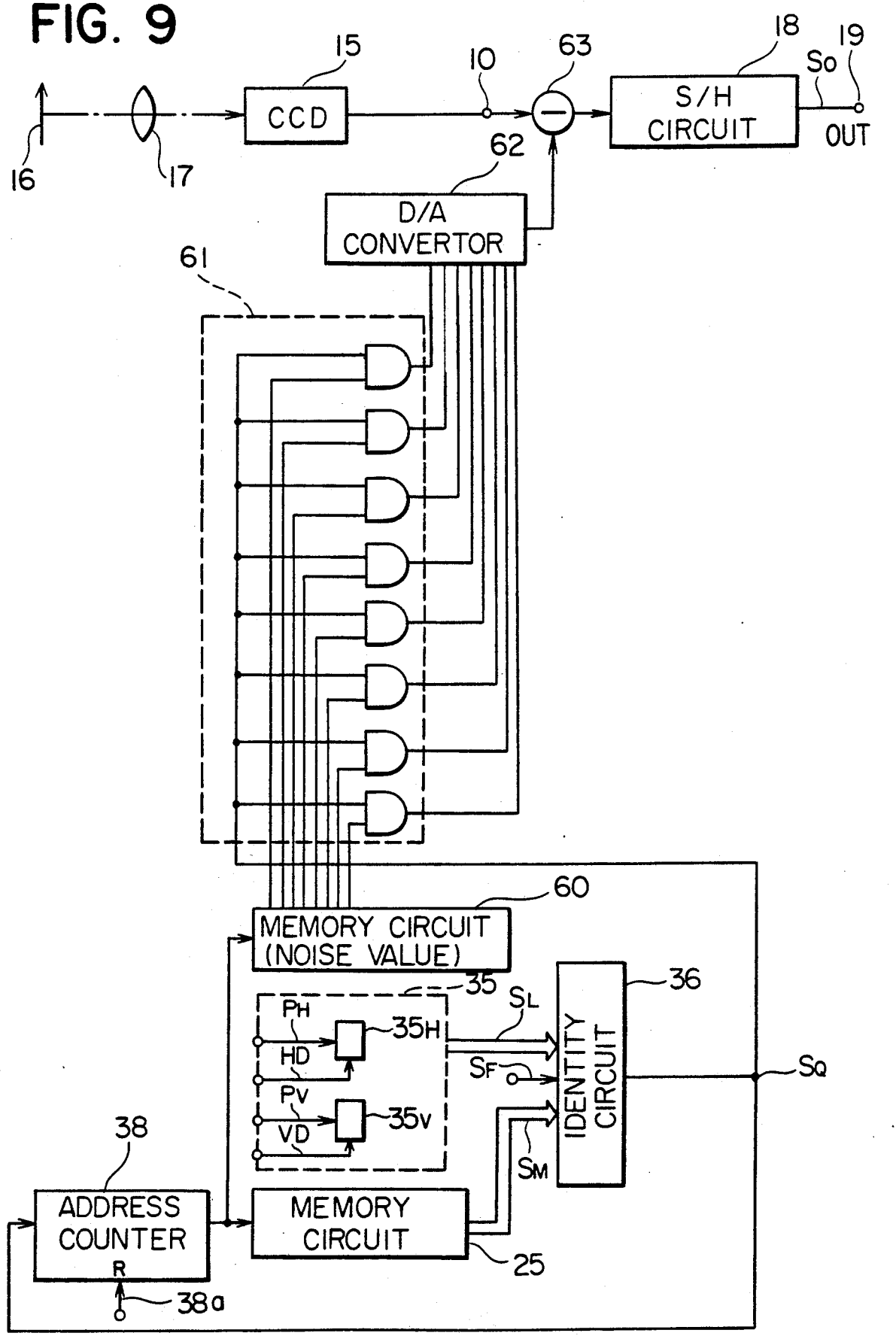
FIGS. 9 to 12 are block diagrams of second to fifth embodiments of the defect compensating apparatus of the present invention.

FIG. 9 shows a second embodiment of the present invention, wherein the same components as those in FIGS. 1 to 8 are represented by the same numbers or symbols. In comparison with the apparatus shown in FIG. 4, the present embodiment is additionally provided with a noise value memory 60 storing the values of increase in the dark voltage in the defective pixels from an average voltage; a gate circuit 61 for passing the output from noise value memory 60 in response to an identity signal $S_Q$; a D/A converter 62 for converting the output of the gate circuit 61 into an analog signal; and a subtraction circuit 63 for subtracting the output of the D/A converter 62 from the output of the CCD 15. The noise value memory 60 stores the noise values measured in advance corresponding respectively to the defects.

The function of the above-explained apparatus is as follows. When the output $S_M$ of the defect position memory coincides with the position signal $S_L$ and the field signal $S_F$, the identity circuit releases an identity signal $S_Q=$"1", whereby the gate circuit 61 releases a noise value stored in the noise value memory 60, of a pixel corresponding to the output $S_M$ of the defect position memory. The noise value is converted into an analog signal by the D/A converter 62, and is subtracted from the noise-including output of the CCD. On the other hand, identity signal S is also supplied to the address counter 38 to obtain another output $S_M$ of a succeeding defect position, and a succeeding noise value is supplied to the input of the gate circuit 61. Unless the gate circuit 61 is opened, the D/A converter 62 provides a zero output, whereby the output of the subtracting circuit 63 is same as that of the CCD.

Figure 10:
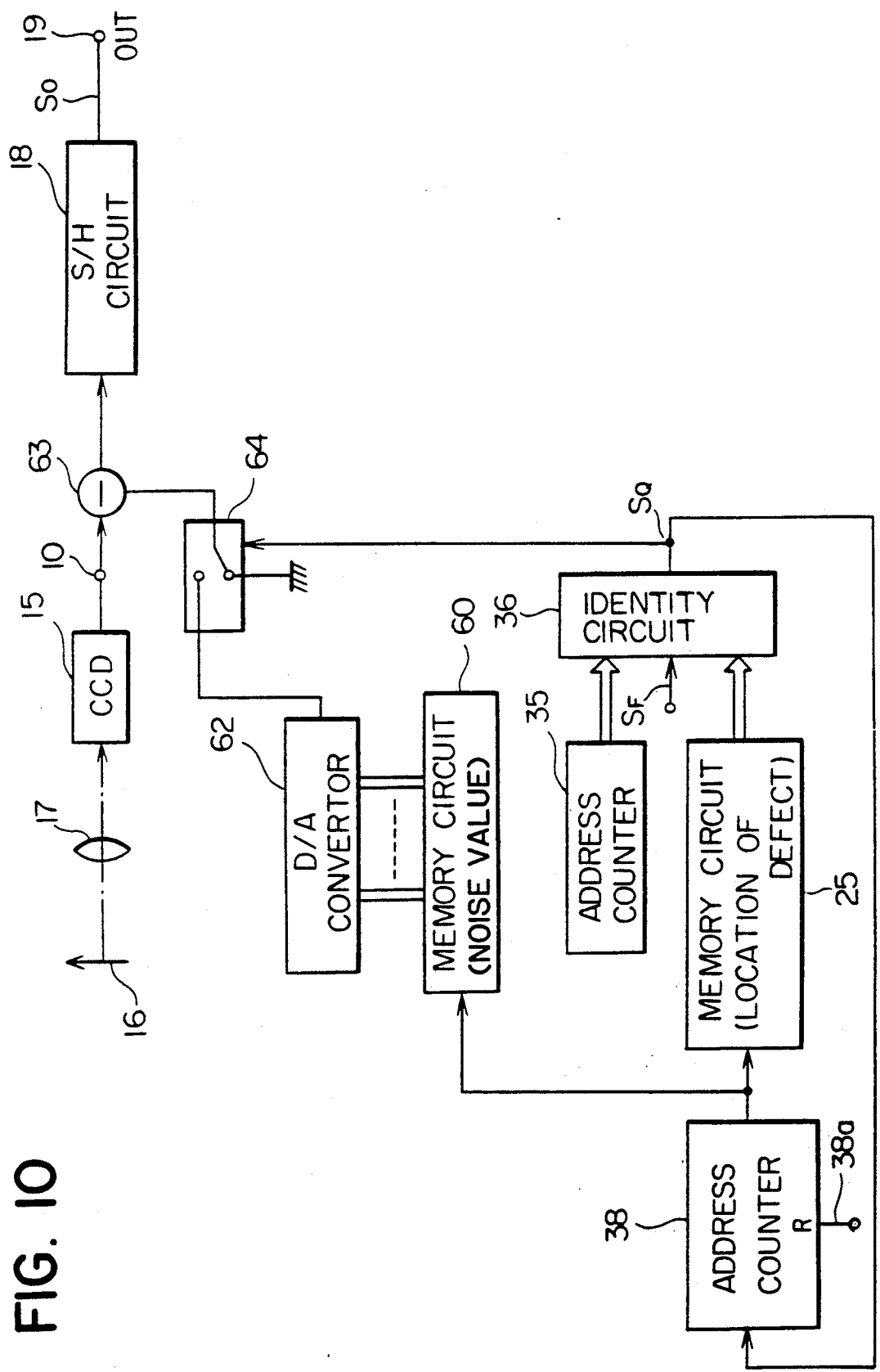

FIG. 10 shows a third embodiment which constitutes an improvement over the apparatus shown in FIG. 9, for achieving same effects more inexpensively. In the structure shown in FIG. 10, the gate circuit 61 shown in FIG. 9 is removed, so that the output of the noise value memory 60 is directly supplied to the D/A converter 62. Besides the output of said D/A converter 62 is supplied to a high-speed switching circuit 64 additionally provided. Switching circuit 64 is normally grounded, but, in response to the output signal $S_Q$ of the identity circuit 35, guides the output of the D/A converter 62 to the subtractor 63.

In the normal state where the switching circuit 64 is grounded, the subtractor 63 receives "0". However, when the identity circuit 35 releases an output signal $S=$"1", the switching circuit 64 is shifted to the D/A converter 62 to supply a D/A-converted noise value to the subtractor 63, thereby correcting the noise-containing output of the CCD 15. In the present embodiment, the D/A converter is only required to release a suitable output in an interval between two neighboring defect positions and need not be of a high speed. Consequently the defect compensating apparatus can be formed inexpensively.

In the embodiments shown in FIGS. 9 and 10, it is assumed that the noise value to be compensated for is constant regardless of the temperature, but, in practice the noise level in the dark current has a strong temperature dependence, for example being doubled for a temperature increase of 8° C in case of a silicon-based CCD. Consequently the amount of compensation should be made variable according to the temperature at use, for achieving more complete compensation.

Figure 11:
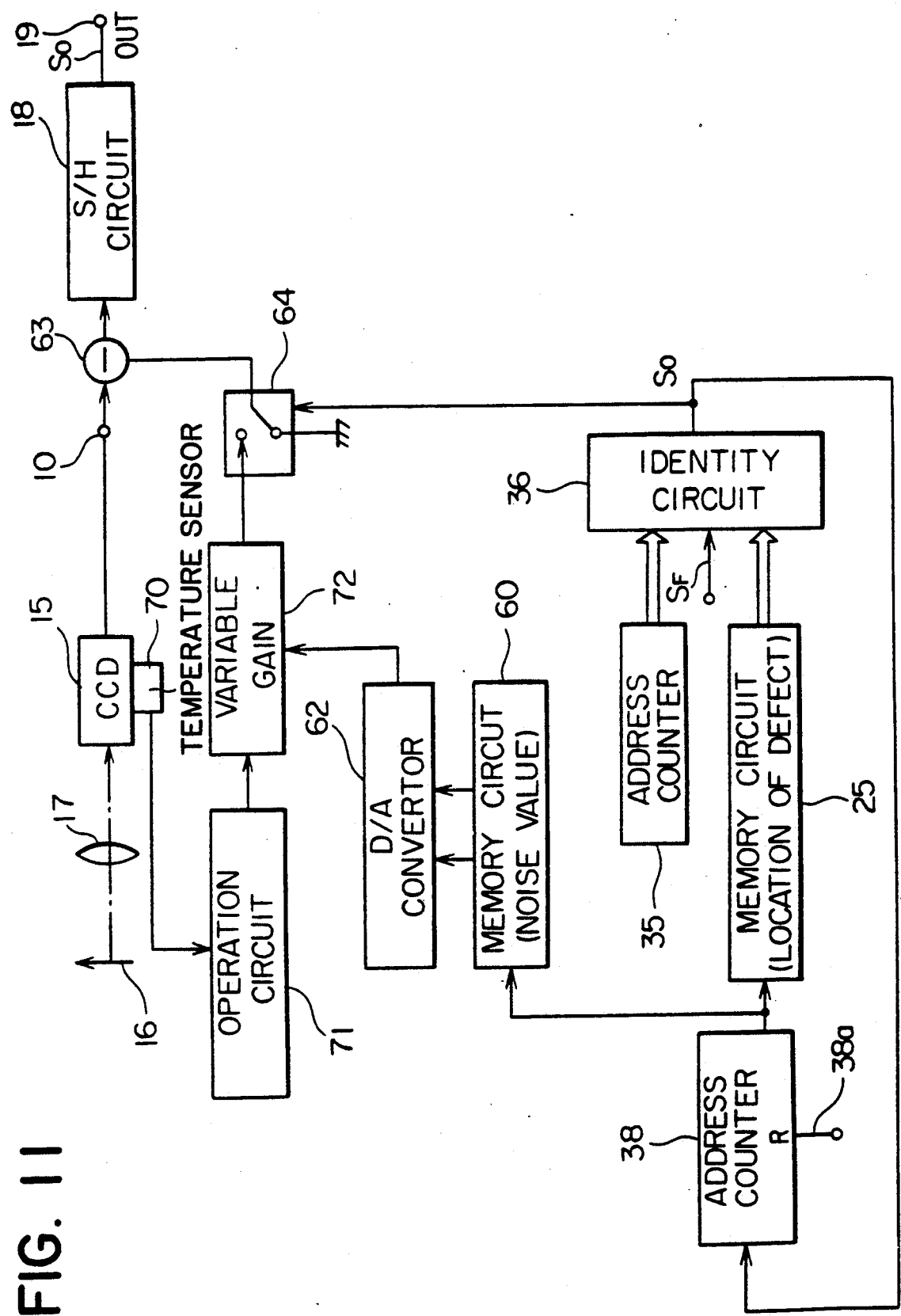

FIG. 11 shows a fourth embodiment in which the amount of compensation is regulated according to the temperature, wherein provided are a temperature sensor 70 for detecting the temperature of the CCD 15, an operation circuit 71 for calculating the amount of compensation corresponding to the temperature of the CCD 15 based on the output of the temperature sensor 70, and a variable-gain amplifier 72 for amplifying the output of a D/A converter 62 with a gain determined from the output of the operation circuit 71.

The function of the above-explained embodiment will be explained in the following. The temperature of the CCD 15 is constantly watched by the temperature sensor 70, and the operation circuit 71 calculates the amount of compensation at the temperature and determines the gain of the variable-gain amplifier 72 according to the signal from the temperature sensor 70. The output of the D/A converter 62 is supplied to amplifier 72, so that a noise value compensated according to the temperature is supplied to the switching circuit 64. Consequently there is obtained an appropriate compensation for the CCD 15 even in the presence of a change in temperature.

Figure 12:
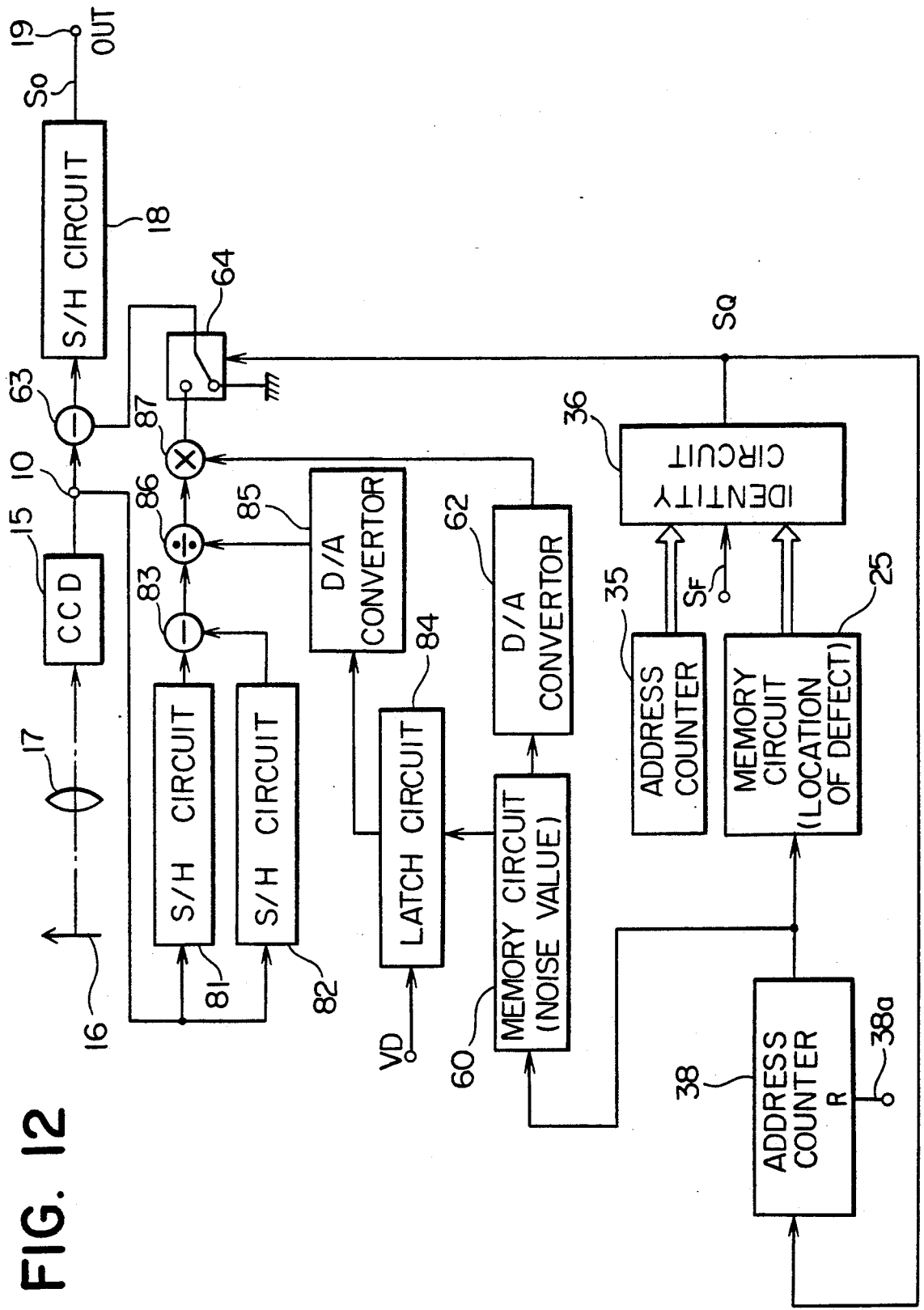

FIG. 12 shows a fifth embodiment capable of achieving same effect as that in the fourth embodiment shown in FIG. 11 through a simple calculation based on the proportional relationship between the dark voltage and noise of the CCD 15, instead of defect compensation based on temperature detection.

In FIG. 12 there are provided a sample hold circuit 81 for sampling an output of a dark voltage output unit formed by shielding a part of the pixels of the CCD 15; a sample and hold circuit 82 for sampling an output of a dummy pixels, not involved in the actual image reading, of the CCD 15; a subtraction circuit 83 for obtaining an exact dark voltage component by subtracting the output of the sample and hold circuit 82 from that of the sample and hold circuit 81; a noise value memory 60 storing the average dark voltage obtained by measuring the defect noise values of the CCD 15, thus providing the dark voltage value of a field at the start of said field; a latch circuit 84 for latching, for a period of a field, the reference dark voltage supplied from noise value memory 60 at the start of said field; a D/A converter 85 for D/A conversion of the output of the latch circuit 84; a division circuit for dividing the output of the subtraction circuit 83 with the output of the D/A converter 85; and a multiplication circuit 87 for multiplying the output of said division circuit 86 with the output of the D/A converter 62.

The function of the above-explained embodiment will be explained in the following. At the start of image reading of a field, the average dark voltage of the field is read from the noise value memory 60 and is latched in the latch circuit 84 for the duration of a field. The output of said latch circuit 84 is subjected to D/A conversion in the D/A converter 85 and supplied to the division circuit 86. On the other hand, at the start of the field, the outputs of the dark level portion and dummy pixel portion of the CCD 15 are retained respectively by the sample and hold circuits 81, 82 for the duration of a field. The subtraction circuit 83 calculates the difference of outputs of said two portions, and supplies the dark voltage level at use to the division circuit 86, which executes a calculation:

(dark voltage level at use)/(dark voltage level at defect noise measurement)

and supplies the obtained result, as a multiplication factor A, to the multiplication circuit 87. Thus said multiplication circuit 87 multiplies the defect noise value at noise measurement, obtained from the D/A converter 62 with said factor A. In this manner the switching circuit 64 receives a temperature-corrected noise value to achieve exact defect compensation regardless a change in the temperature.

As explained in the foregoing, the second to fifth embodiments can achieve complete elimination of the noise component even in an object having no correlation in the horizontal direction, by subtracting a noise component resulting from a defect, from a noise-containing output instead of conventional replacement of the signal of a defective pixel. Particularly the fourth and fifth embodiments allow one to achieve appropriate removal of noises resulting from defects and to obtain a satisfactory image regardless of the temperature at use, by subtracting an amount of noise corresponding to the temperature or the temperature-dependent dark current of the solid state image sensor device.

We claim:

1. An image sensing apparatus comprising:
   image sensing means for sensing the image of an object through a color separation optical system of a predetermined color pattern;
   separating means, having a plurality of sample and hold means each for receiving a time-sequential signal obtained from said image sensing means and for separating therefrom and outputting a respective color signal representing a respective predetermined color, thereby separating the time-sequential signal into the respective signals from the plurality of sample and hold means;
   memory means for memorizing defect position information relating to said image sensing means; and
   correction means for correcting a defect in one of said respective color signals with a signal representing the same color by stopping the operation of the sample and hold means which outputs said one color signal, in accordance with said defect position information.

2. An image sensing apparatus according to claim 1, wherein said image sensing means comprises plural pixels arranged in a matrix.

3. An image sensing apparatus according to claim 2, wherein said correction means comprises a memory storing in advance information of defective pixels in said plural pixels of the image sensing means.

4. An image sensing apparatus comprising:
   image sensing means provided with plural pixels arranged as a matrix and adapted to respectively receive light through predetermined color filters;
   luminance signal forming means for forming a luminance signal from a signal obtained from said image sensing means;
   color signal forming means for forming plural color signals from the signal obtained from said image sensing means;
   first correction means for correcting a defect in said luminance signal corresponding to a predetermined pixel using a correcting luminance signal from said image sensing means, which correcting luminance signal corresponds to a pixel immediately preceding said predetermined pixel; and
   second correction means for correcting a defect in a color signal corresponding to the predetermined pixel using a correcting color signal from said image sensing means, which correcting color signal corresponds to a pixel preceding said predetermined pixel by a plurality of pixels.

5. An image sensing apparatus according to claim 4, wherein said luminance signal forming means comprises a sample and hold circuit for periodically sampling and holding the signal obtained from said image sensing means.

6. An image sensing apparatus according to claim 4, wherein said chroma signal forming means comprises a sample and hold circuit for periodically sampling and holding the signal obtained from said image sensing means.

7. An image sensing apparatus according to claim 4, wherein said color signal forming means comprises a sample and hold circuit for periodically sampling and holding the signal obtained from said image sensing means.

8. An image sensing apparatus according to claim 4, wherein said first correction means comprises a memory storing, in advance, information of defective pixels from among said plural pixels of said image sensing device.

9. An image sensing apparatus according to claim 4, wherein said color filters comprise a plurality of filters of respective different colors which filters are arranged periodically.

10. An image sensing apparatus according to claim 4, wherein said second correction means corrects a defect in a color signal corresponding to said predetermined pixel by using a pixel receiving light through a filter of the same color as said predetermined pixel.

11. An image sensing apparatus according to claim 4, wherein said pixel immediately preceding said predetermined pixel, and said pixel preceding said predetermined pixel by a plurality of pixels, are in a single horizontal row of the matrix.

12. An image sensing apparatus comprising:
 (a) an image sensing device having plural pixels arranged as a matrix and each adapted to receive light through respective predetermined-color filters;
 (b) luminance signal forming means for forming a luminance signal from a signal output by said image sensing device in response to the light;
 (c) color signal forming means for forming plural color signals from the signal output by said image sensing device; and
 (d) correcting means for correcting a defect in the luminance signal corresponding to a predetermined pixel, using a signal from a pixel abutting said predetermined pixel, and for correcting a defect in a color signal corresponding to the predetermined pixel using a signal from a pixel spaced apart from said predetermined pixel.

13. An image sensing apparatus according to claim 12, wherein said color filters comprise a plurality of filters of respective different colors which filters are arranged periodically.

14. An image sensing apparatus according to claim 13, wherein said correcting means corrects a defect in a color signal corresponding to said predetermined pixel, using a pixel receiving light through a filter of the same color as said predetermined pixel.

15. An image sensing apparatus according to claim 12, wherein said pixel abutting said predetermined pixel and said pixel spaced apart from said predetermined pixel are in one horizontal line of said matrix.

16. An image sensing apparatus according to claim 12, wherein said correcting means comprises a memory storing, in advance, information of defective pixels from among said pixels of said image sensing device.

17. An image sensing apparatus according to claim 12, wherein said luminance signal forming means comprises a sample and hold circuit for periodically sampling and holding the signal output by said image sensing device.

18. An image sensing apparatus according to claim 12, wherein said color signal forming means comprises a sample and hold circuit for periodically sampling and holding the signal output by said image sensing device.

* * * * *

UNITED STATES PATENT AND TRADEMARK OFFICE
CERTIFICATE OF CORRECTION

PATENT NO. : 5,113,246
DATED : May 12, 1992
INVENTOR(S) : KUNIO NINOMIYA, ET AL.

It is certified that error appears in the above-identified patent and that said Letters Patent is hereby corrected as shown below:

COLUMN 1

Line 45, "noises." should read --noise.--.

COLUMN 2

Line 17, "difficultly" should read --difficulty--.
Line 19, "pixel" should read --pixel,--.
Line 57, "Then" should read --Now--.

COLUMN 3

Line 50, "the separated" should read --the thus separated--.

COLUMN 4

Line 54, "sample" should read --sample and--.

COLUMN 5

Line 9, "a" (second occurrence) should read --the--.
Line 19, "said" should read --the--.

COLUMN 6

Line 16, "said" should be deleted.
Line 25, "S="1"," should read --$S_0$="1",--.
Line 62, "circuit 64." should read --circuit 69.--.

UNITED STATES PATENT AND TRADEMARK OFFICE
CERTIFICATE OF CORRECTION

PATENT NO. : 5,113,246
DATED : May 12, 1992
INVENTOR(S) : KUNIO NINOMIYA, ET AL.

Page 2 of 2

It is certified that error appears in the above-identified patent and that said Letters Patent is hereby corrected as shown below:

COLUMN 8

Line 7, "respective signals" should read
--respective color signals--.
Lines 52-5, Claim 6 should read: --6. An image sensing apparatus according to claim 3, wherein said image sensing means comprises a solid state image sensor device.--.

Signed and Sealed this

Twentieth Day of July, 1993

Attest:

MICHAEL K. KIRK

Attesting Officer

Acting Commissioner of Patents and Trademarks